VARIABLE WIDTH PULSE GENERATOR

Filed May 28, 1964 2 Sheets-Sheet 1

INVENTOR
W. B. HARRIS
BY Herbert M. Shapiro
ATTORNEY

United States Patent Office 3,359,498
Patented Dec. 19, 1967

3,359,498

VARIABLE WIDTH PULSE GENERATOR

William B. Harris, Bernardsville, N.J., assignor to Bell Telephone Laboratories, Incorporated, New York, N.Y., a corporation of New York Filed May 28, 1964, Ser. No. 370,934
10 Claims. (Cl. 328—57)

ABSTRACT OF THE DISCLOSURE

A variable width pulse generator includes first and second controlled rectifiers and a tuned circuit connected with a load across a source of constant potential. Current flows through the load for the full period of the tuned circuit less the time between the closing of the second and the first rectifiers. The operation is due to circulating currents initiated in the tuned circuit when the second rectifier is closed. The circulating currents open the second rectifier at the end of one-half period of the tuned circuit and open the later closed first rectifier at the end of the full period. Various embodiments are described.

This invention relates to pulse generators, and, more particularly, to pulse generators of the type supplying pulses of variable durations.

Frequently, pulse generating circuits include a controlled switch such as a silicon controlled rectifier connected electrically in series with a load across which an output is developed. Such a switch is conveniently closed and opened, respectively, for initiating and terminating current through the load. Often, a pulse generator which includes such a switch also includes a tuned circuit which operates in response to the closing of the switch to open the switch at a fixed time thereafter thus terminating the pulse through the load. This fixed time is equal, esssentially, to one half the period of the tuned circuit and may be varied by changing the capacitance and/or the inductance of the tuned circuit. The use of tuned circuits in this connection is discussed in the July 1963 issue of "Electronic Engineering," at page 470 et seq.

For some circuit applications such as in certain pulse testing circuits and in radar applications, it is advantageous to provide pulses of different durations without changing the capacitance and/or the inductance of such a tuned circuit. Moreover, it is frequently desirable, for example, in radar applications, to produce high power pulses across a load. To this end, it is desirable to employ a low impedance source and to employ switching elements which also are characterized by low impedances in order to avoid losses therein. Although silicon controlled rectifiers are well suited as switches in such circuits, difficulties are encountered therewith in turning off high current pulses.

Accordingly, a prime object of this invention is to provide a new and novel pulse generator capable of delivering pulses of controllably different durations.

Another object of this invention is to provide a pulse generator capable of producing, with little loss, high power pulses across a load.

The above and further objects of this invention are realized in one embodiment thereof wherein first and second silicon controlled rectifiers are connected electrically in series with a load across a source of constant electric potential. The second rectifier is further connected electrically in parallel with a serial arrangement of an inductor and a capacitor forming a tuned circuit, and, also, with a diode poled in a direction opposite to that in which the second rectifier is poled. In this connection the term "poled in a direction opposite . . ." indicates that the diode and the rectifier are connected, individually, to pass current in directions opposite to one another. In response to the closing of the second rectifier, circulating currents are initiated in the tuned circuit. These currents operate to open the second rectifier at the end of one half the period of the tuned circuit and open the first rectifier at the end of the full period. Current flows through the load for a time equal to the full period of the tuned circuit less the time between closing the second and first rectifiers which time may, conveniently, be fixed by external circuitry. Thus, the termination of the pulse through the load is at a time fixed by the closing of one rectifier. The time of the initiation of the pulse, however, is fixed, independently, by the closing of another rectifier.

In another embodiment of this invention, a first silicon controlled rectifier, connected electrically in series with a load across a source of constant electric potential, is also connected electrically in parallel with a series arrangement of a second silicon controlled rectifier shunted by an oppositely poled diode, and an inductor and a capacitor forming a tuned circuit. Current flow through the load is initiated by closing the first rectifier; the current flow is terminated, at a time equal to the full period of the tuned circuit after the second rectifier is closed, by currents circulating in the tuned circuit in response to the closing of the second rectifier. Again, times for the initiation and termination of a pulse through a load are fixed independently by different rectifiers.

Accordingly, a feature of this invention is first and second controlled rectifiers for controllably fixing the duration of current flowing through a load.

Another feature of an embodiment of this invention is a tuned circuit cooperating with the first and second controlled rectifiers to open the controlled rectifiers at different times in response to the closing of the second rectifier.

The invention and the further objects and features thereof will be understood more fully with reference to the following description rendered in connection with the accompanying drawing in which.

Figure 1:
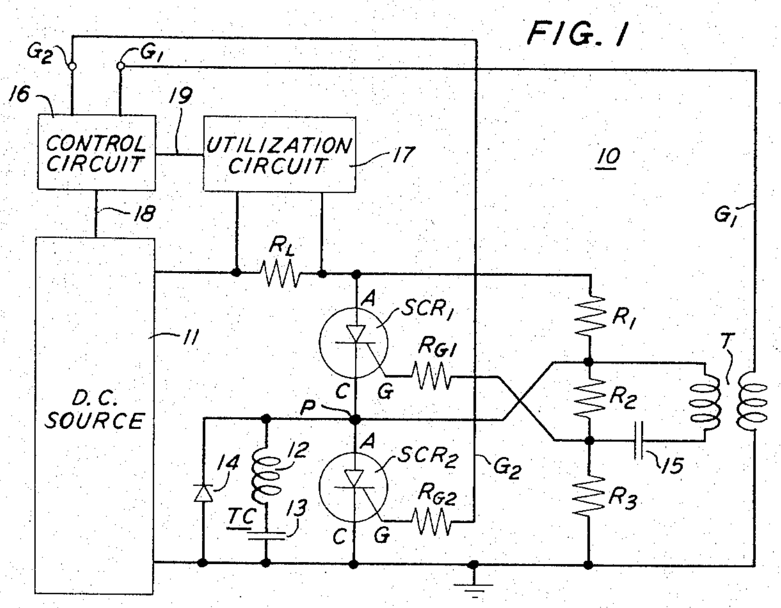
FIG. 1 is a schematic representation of a first embodiment of this invention.

FIG. 1 shows a circuit 10 in accordance with this invention. The circuit comprises a basic arrangement of a load resistance $R_L$ and first and second silicon controlled rectifiers $SCR_1$ and $SCR_2$ connected electrically in series across a low impedance direct current source of constant electric potential 11. Each rectifier includes an anode, a cathode, and a gate electrode designated A, C, and G, respectively. The lower connection to the source 11, as viewed in the figure, is electrically at ground potential. The second rectifier, $SCR_2$ has connected, electrically in parallel therewith, a serial arrangement of an inductor 12 and a capacitor 13, forming a tuned circuit TC and, electrically in parallel thereacross, a diode 14. Rectifier $SCR_2$ is poled in the same direction as rectifier $SCR_1$ to permit current to flow from source 11 through load resistance $R_L$, through the two rectifiers to ground, when both of the rectifiers are conducting, or, in other words, closed. Diode 14 is poled in a direction opposite to that of rectifier $SCR_2$. A voltage divider network of three resistances $R_1$, $R_2$, and $R_3$ is connected electrically in parallel across both rectifiers $SCR_1$ and $SCR_2$.

Each of the rectifiers is provided gate circuitry. For clarity, however, only the gate circuitry for rectifier $SCR_1$ is shown; the gate circuitry for rectifier $SCR_2$ may be, but is not necessarily, the same. Specifically, the gate circuitry $G_1$ for rectifier $SCR_1$ comprises a first circuit including a series arrangement of a gate resistance $R_{G1}$, a capacitor 15, and the secondary of a transformer T, electrically in parallel with resistance $R_2$, connected between the gate electrode of the rectifier $SCR_1$ and a point P in the circuit between the two rectifiers $SCR_1$ and $SCR_2$. The gate circuitry $G_1$ also comprises a second circuit including the primary of the transformer T connected between a control circuit 16 and ground. The gate circuitry $G_2$ is represented by a conductor designated $G_2$ from the gate electrode of rectifier $SCR_2$ to a terminal of control circuit 16. The conductor is shown including only the gate resistance $R_{G2}$.

A utilization circuit 17 is connected across the load resistance $R_L$. In this connection, the utilization circuit may be any circuit capable of using a pulse developed across load resistance $R_L$ in accordance with this invention. Control circuit 16 is connected to the source 11 and to the utilization circuit 17 via conductors 18 and 19, respectively.

In the operation of the circuit of FIG. 1 in accordance with this invention, source 11 is turned on and capacitor 13 in tuned circuit TC is charged to the voltage of source 11 through rectifier $SCR_1$, closed under the control of control circuit 16, specifically to this end. As will become apparent hereinafter, capacitor 13, in practice, is in a charged condition at the termination of each pulse provided through load resistance $R_L$ in readiness for a subsequent operation. In this connection, source 11 and control circuit 16 may be any source and circuit, respectively, capable of performing in accordance with this invention. Rectifier $SCR_1$ opens when current therethrough drops below the sustaining level. After rectifier $SCR_1$ opens, the current through load resistance $R_L$ becomes insignificant. In this connection, the values of resistances $R_1$, $R_2$, and $R_3$ are chosen high to permit the passage of only a negligible current therethrough.

Figure 2:
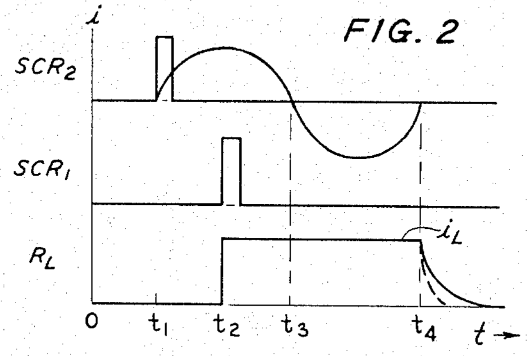
FIG. 2 is a pulse diagram showing the control pulses for closing and opening the rectifiers in the circuit of FIG. 1 and the current flowing through the load resistance in response thereto.

Then, rectifier $SCR_2$ is closed by a gate pulse under the control of control circuit 16 at a time designated $t_1$ in FIG. 2. In this connection, FIG. 2 shows a plot of current versus time for the current through the load resistance. Also shown in FIG. 2 are the gate pulses for rectifiers $SCR_1$ and $SCR_2$ the latter superimposed on the waveform for the circulating current through inductor 12 and capacitor 13 during what is commonly termed the "period" of the tuned circuit. At a time less than the period of the tuned circuit after the closing of rectifier $SCR_2$, rectifier $SCR_1$ is closed also by a gate pulse under the control of control circuit 16. This time is designated $t_2$ in FIG. 2. For this purpose, the gate pulses are of short duration, typically 1.0 microsecond. The closing of rectifier $SCR_1$ initiates significant current flow $i_L$ through the load resistance $R_L$ if $SCR_2$ is already closed. The prior closing of rectifier $SCR_2$, however, initiates circulating currents in tuned circuit TC which opens $SCR_2$ and $SCR_1$ at fixed times after the closing of $SCR_2$. Specifically, upon closing rectifier $SCR_2$, circulating currents arise from the discharge of capacitor 13 and result in the charging of inductor 12 during what is commonly termed the first "half period" of the tuned circuit. During the second half period of the tuned circuit, current is directed from the inductor 12 back into the capacitor 13. At the onset of this second half period, designated $t_3$ in FIG. 2, $SCR_2$ is opened by the reversal of the circulating currents. The upper plate of capacitor 13 (as viewed in FIG. 1) at this time is charged negative by the circulating currents and the current flowing through the load resistance, requiring the lower plate thereof to accumulates a positive charge. Capacitor 13, thereafter, discharges through diode 14. The current $i_L$ flowing through the load resistance $R_L$ also flows through diode 14 until the positive charge on the lower plate of capacitor 13 is exhausted, at which time, designated $t_4$ in FIG. 2, current flow through diode 14 stops, rectifier $SCR_1$ is opened, consequently, and current flow $i_L$ through the load resistance ceases.

It is thus shown that, in response to the closing of the second rectifier $SCR_2$, circulating currents are initiated in the tuned circuit TC. These circulating currents open the second rectifier $SCR_2$ at, essentially, the half period of the tuned circuit, and open the first rectifier $SCR_1$, essentially, at the end of the full period of the tuned circuit. In this manner, current flow through the load is terminated at a time essentially equal to the full period of the tuned circuit after rectifier $SCR_2$ is closed.

It is also shown that current through the load resistance is initiated, independent of the termination time thereof, by closing the first rectifier $SCR_1$, if, and only if, the second rectifier $SCR_2$ has already been closed. Accordingly, current flows through the load resistance for a time equal to, essentially, the full period of the tuned circuit less the time between closing the second and the first rectifiers. Since the closing of the rectifiers is via gate pulses under the control of control circuit 16, the circuit of FIG. 1, thus, controllably provides current pulses having durations equal to, essentially, the period of the tuned circuit or less. This corresponds to a range of, typically, 30 microseconds to about 1.0 microsecond.

The current flowing through resistances $R_1$, $R_2$, and $R_3$ provides a negative bias on the gate of $SCR_1$ when both rectifiers are open. When rectifier $SCR_2$ is closed, the anode electrode of rectifier $SCR_2$ is essentially grounded and the negative bias provided through resistance $R_2$ is lost. Also, when rectifier $SCR_2$ is closed, the high rate of change of voltage with respect to time ($dv/dt$) thereacross, characteristic of such rectifiers, tends to close, prematurely, rectifier $SCR_1$. The voltage across capacitor 15, however, maintains the bias on the gate of rectifier $SCR_1$ for a sufficient time thereafter to avoid premature closing of rectifier $SCR_1$.

Figure 3:
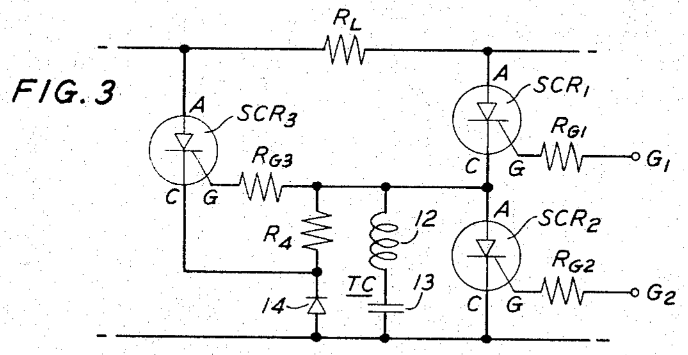
FIG. 3 is a modified portion of the circuit of FIG. 1.

In the circuit of FIG. 1 current flow through load resistance $R_L$ was described as terminating when the positive charge on the lower plate of capacitor 13 is exhausted through diode 14. Actually, current flow through the load resistance continues slightly beyond this juncture to again recharge capacitor 13 to its initial condition. This recharging of the capacitor determines the decay time for the current $i_L$ through the load resistance as shown by the trailing edge of the pulse $i_L$ in FIG. 2. The actual shape of the decay, of course, depends on the value of the resistance $R_L$ and the values of the inductance and capacitance of elements 12 and 13, respectively. For any given values of load resistance and inductance and capacitance, however, the decay can be made distinctly sharper, for example, from a typical decay time of about 20 microseconds, by a factor of 10 to 2 microseconds, in accordance with the modification of the circuit of FIG. 1 as shown in FIG. 3. The improvement in decay time is illustrated by the broken trailing edge of pulse $i_L$ in FIG. 2.

Since FIG. 3 is a modification of circuit 1, only as much of circuit 1 as is necessary for an orientation of the modification therein is shown. Furthermore, those elements of FIG. 1 shown in FIG. 3 are given the same designations there as in FIG. 1 and will not be discussed further. Specifically, in accordance with this modification the anode electrode A of an additional silicon controlled rectifier $SCR_3$ is connected between the source 11 and the load resistance $R_L$; the cathode C and the gate G electrodes of the rectifier $SCR_3$ with a resistance $R_4$ between them are connected between diode 14 and inductor 12. The gate circuit of rectifier $SCR_3$ also includes a resistance $R_{G3}$.

In operation, when the discharge of capacitor 13 through diode 14 is complete, current starts to flow through diode 14 in the reverse direction for a brief period until diode 14 is reverse biased. This current flow through resistance $R_4$ is sufficient to "gate" rectifier $SCR_3$ in (closed) permitting the recharging of capacitor 13 through rectifier $SCR_3$ rather than through the load. In this manner, the current through the load resistance decays more sharply than in accordance with the circuit of FIG. 1.

The circuit of FIG. 1, as was stated hereinbefore, provides variable width pulses with a maximum duration essentially that of the period of the tuned circuit. For many applications, however, pulses of longer duration are required. Such pulses are provided, in accordance with this invention, by the circuit of FIG. 4.

Figure 4:
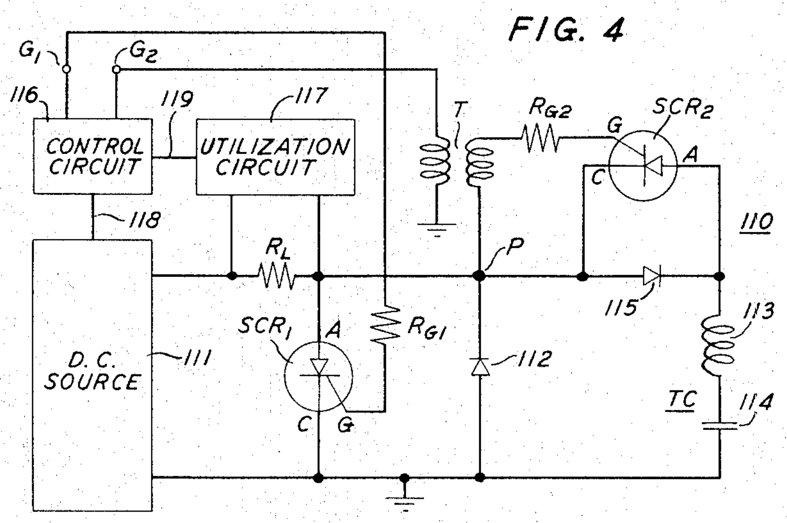
FIG. 4 is a schematic representation of a second embodiment of this invention.

Specifically, FIG. 4 shows a circuit 110 in accordance with this invention. The circuit comprises a basic arrangement of a load resistance $R_L$ and a first silicon controlled rectifier $SCR_1$ connected in series across a low impedance direct current source of constant electric potential 111. The lower connection, as viewed in the figure, is electrically at ground potential. A diode 112 is connected electrically in parallel with the rectifier $SCR_1$ and poled oppositely thereto. A series arrangement of a second silicon controlled rectifier $SCR_2$, an inductor 113 and a capactior 114 is also connected electrically in parallel with the rectifier $SCR_1$. Thus a tuned circuit TC is formed. The rectifiers $SCR_1$ and $SCR_2$ are poled in opposite directions. A diode 115 is connnected electrically in parallel with $SCR_2$ and poled oppositely therefrom as shown in FIG. 4. Both rectifiers $SCR_1$ and $SCR_2$ may be connected by like gate circuitry. Only the gate circuitry $G_2$ for rectifier $SCR_2$ is shown, however. Specifically, the gate electrode G of rectifier $SCR_2$ is connected to a common point P between rectifiers $SCR_1$ and $SCR_2$ through the secondary of a transformer $T_1$ and a gate resistance $R_{G2}$. The primary is connected between ground and a control circuit 116 at a terminal designated $G_2$. The gate circuitry for rectifier $SCR_1$ is represented by a conductor designated $G_1$, including only gate resistance $R_{G1}$, connected to a terminal $G_1$ of control circuit 116. A utilization circuit 117 is connected across the load resistance $R_L$. Control circuit 116 is connected to source 11 and utilization circuit 117 via conductors 118 and 119, respectively. Pulse source 111, control circuit 116, and utilization circuit 117 may be any circuit elements capable of performing in accordance with this invention.

Figure 6:
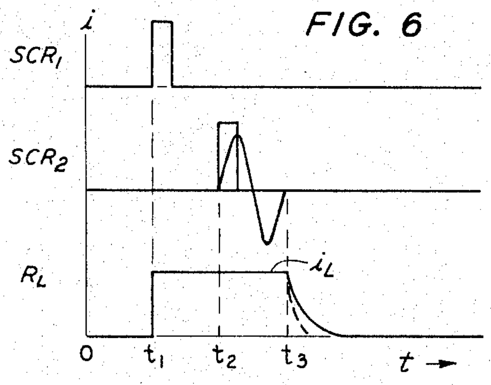
FIG. 6 is a pulse diagram showing the control pulses for closing and opening the rectifiers in the circuit of FIG. 4 and the current flowing through the load resistance in response thereto.

In operation, source 111 is turned on, and capacitor 114 is initially charged to the source potential via diode 115. (As will become apparent hereinafter, the capacitor is in a charged condition at the termination of a previous pulse.) Thereafter, at a time designated $t_1$ in FIG. 6, rectifier $SCR_1$ is closed via gate circuitry $G_1$ under the control of control circuit 116. The closing of rectifier $SCR_1$ provides a current path to ground, and, consequently, current flows through load resistance $R_L$ for any desired length of time. Thereafter, at an arbitrary time designated $t_2$ in FIG. 6, rectifier $SCR_2$ is closed via a pulse in gate circuitry $G_2$ under the control of control circuit 116 thus initiating circulating currents through inductor 113 and capacitor 114. The circulating current is represented by the sine wave in FIG. 6. Specifically, in response to the closing of rectifier $SCR_2$, capacitor 114 discharges through rectifiers $SCR_1$ and $SCR_2$, charging inductor 113 during the first half period of the tuned circuit. At the onset of the second half period of the tuned circuit, rectifiers $SCR_1$ and $SCR_2$ are opened by the reversal of current therethrough. During the second half period of the tuned circuit, inductor 113 recharges capacitor 114, current flowing through diodes 112 and 115. At the termination of the second period of the tuned circuit, current flows through diode 112 until the charge on capacitor 114 is exhausted, current $i_L$ through load resistance $R_L$ terminating at a time, designated $t_3$ in FIG. 6, equal, essentially, to the full period of the tuned circuit after the closing of rectifier $SCR_2$.

Figure 5:
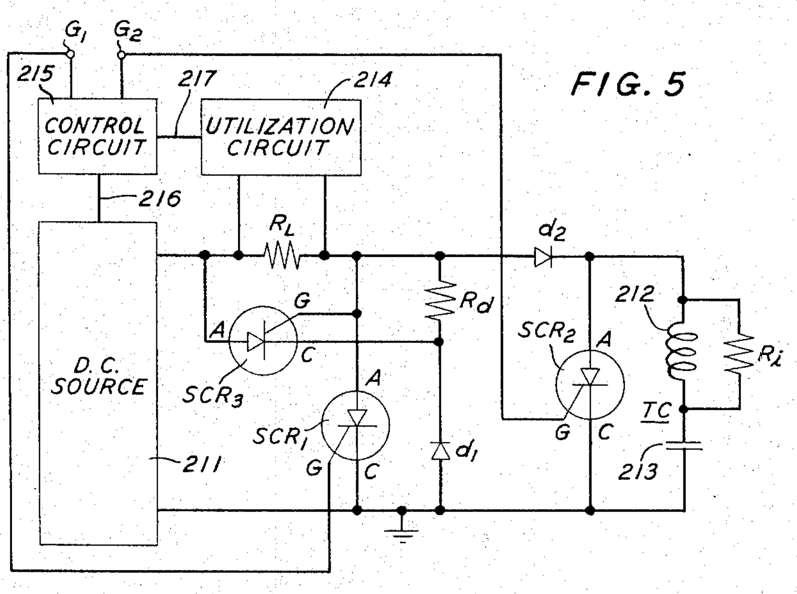
FIG. 5 is a schematic representation of a modification of the circuit of FIG. 4.

FIG. 5 shows a circuit 210, in accordance with this invention, which is quite similar to the circuit of FIG. 4. Specifically, a load resistance $R_L$ and a silicon controlled rectifier $SCR_1$ are connected in series across a direct current source of constant electric potential 211, the lower connection, as viewed in the figure being at ground potential. The rectifier $SCR_1$ is connected electrically in parallel with a branched network including, in one branch, a diode $d_1$ poled in a direction opposite to that of rectifier $SCR_1$, in the second branch, a second silicon controlled rectifier $SCR_2$ poled in the same direction as rectifier $SCR_1$, and, in a third branch, a series arrangement of an inductor 212 and a capacitor 213 forming a tuned circuit TC. In addition, a resistance $R_d$ is connected electrically in series with the diode $d_1$ and a resistance $r_1$ is connected electrically in parallel with inductor 212. A diode $d_2$ is connected between the two rectifiers $SCR_1$ and $SCR_2$, poled in the direction of rectifier $SCR_2$. A utilization circuit 214 is connected across load resistance $R_L$. The source 211 and utilization circuit 214 are connected to a control circuit 215 via conductors 216 and 217, respectively. The anode and gate electrodes A and G, respectively, of a third silicon controlled rectifier $SCR_3$ are connected across the load resistance, and the cathode electrode C thereof is connected between resistance $R_d$ and diode $d_1$. The gate circuits of the various rectifiers are represented by broken lines designated $G_1$ and $G_2$ for connection to control circuit 215 at terminals $G_1$ and $G_2$ there. The circuits, however, are not otherwise illustrated.

In operation, the circuit of FIG. 5 performs quite similarly to that of FIG. 4. Specifically, current flow through the load resistance $R_L$ is initiated by closing rectifier $SCR_1$ under the control of control circuit 215. Current flow through the load resistance $R_L$ is terminated by closing rectifier $SCR_2$ at a time equal to, essentially, the period of the tuned circuit TC prior to the desired termination time. In response to the closing of rectifier $SCR_2$, the circuit responds substantially as described in connection with the circuit of FIG. 4 except that the two rectifiers $SCR_1$ and $SCR_2$ are turned off in parallel at the termination of the first half period of the tuned circuit TC rather than being turned off in series as is the mode in accordance with the circuit of FIG. 4.

With the circuit of FIG. 5, a high frequency oscillation occurs across inductor 212 when rectifier $SCR_1$ is closed. This oscillation is superimposed on the voltage of capacitor 213 and may be of sufficient amplitude to activate $SCR_2$ before it is gated closed. This high frequency oscillation is caused by the sudden application of the capacitor voltage across inductor 212 and has a frequency approximately equal to the resonant frequency of the inductor 212 and the capacitance of diode $d_2$. This oscillation is eliminated, essentially, by a resistance $R_1$, across inductor 212, of the value to critically or slightly overdamp the inductor at the oscillation frequency.

The rectifier $SCR_3$ is employed, optionally, to provide a bypass across the load resistance $R_L$ for recharging capacitor 213. In this manner, the current through load resistance $R_L$ decays sharply as described in connection with FIG. 2 and is illustrated in relation to the embodiment of FIG. 5 as the broken trailing edge to the pulse $i_L$ in FIG. 6.

In the various circuits in accordance with this invention, there is a constant forward bias maintained by the source across certain rectifiers therein. For example, in FIG. 4 the source maintains a forward bias on rectifier $SCR_1$. Such rectifiers are characterized by a reverse recovery time, however. In this connection, the term "reverse recovery time" is defined as the difference in time between the time when current is zero in the rectifier and the time thereafter when forward voltage can again be applied without closing the rectifier. Typically, this time is about 10.0 microseconds. From a practical standpoint, this means that when a rectifier is opened by the reversal of current therein in accordance with this invention, that reversal is maintained for a time in excess of the recovery time of the rectifier. Consequently, the half period of a tuned circuit in accordance with this invention is chosen in excess of the recovery time of the rectifiers used. For the circuit of FIG. 4, then, a minum pulse width is about 30 microseconds. This allows time for the reversing current to reach a sufficient amplitude to effect reversal. Any well known series-parallel, inductor-capacitor, pulse-forming network may be substituted for the series inductor and capacitor in circuit 4 for making relatively square, in wave shape, the current flowing through rectifier $SCR_1$ achieveing current reversal more quickly, and, consequently, permitting even narrower pulses with this circuit. For example, with a given recovery time for rectifier $SCR_1$, circuit 4 including such a pulse-forming network provides pulses with widths as narrow as 15 to 20 microseconds rather than 30 microseconds.

In accordance with this invention, typical values for the source, the load resistance, the inductor, and the capacitor therein are 400 volts, 20 ohms, 50 microhenries, and 0.5 microfarad, respectively. A typical repetition rate for a circuit in accordance with this invention is 25 kilocycles. If higher source voltages are used, the rectifiers described herein may be replaced each by a series of rectifiers.

No effort has been made to exhaust the possible embodiments of this invention. It will be understood that the embodiments described are merely illustrative of the invention and various modifications may be made therein without departing from the scope and spirit of the invention.

What is claimed is:

1. A variable width pulse generator comprising first and second controlled switches having first and second gate electrodes, respectively, said first and second switches being connected with a load across a source of substantially constant electric potential, means including first and second gate means connected to said first and second gate electrodes, respectively, for controllably closing said first and second switches in accordance with a timed sequence, a series tuned circuit responsive to the closing of said second switch for controllably opening said first and second switches and a normally reverse-biased diode shunting said series tuned circuit.

2. A variable width pulse generator in accordance with claim 1 wherein said first and second switches are connected in series.

3. A variable width pulse generator in accordance with claim 1 wherein said first and second switches are connected electrically in parallel.

4. A variable width pulse generator comprising first and second controlled rectifiers having first and second gate electrodes, respectively, said first and second rectifiers being connected serially, in like polarity, with a load across a source of substantially constant electric potential, means including first and second gate means connected to said first and second gate electrodes, respectively, for controllably closing the corresponding rectifiers in accordance with a timed sequence, and a tuned circuit responsive to the closing of said second rectifier for opening said first and second rectifiers at different times, said tuned circuit comprising a serial arrangement of an inductor and a capacitor connected electrically in parallel with said second rectifier, and a diode shunting said serial arrangement, said diode being poled in a direction opposite to the direction in which said second rectifier is poled.

5. A variable width pulse generator including a load and first and second silicon controlled rectifiers connected electrically in series across a source of substantially constant electric potential, said first and second rectifiers being connected in like polarity and having first and second gate electrodes respectively, tuned circuit means including an inductor and a capacitor shunted by a diode and a resistance, said tuned circuit means being connected electrically in parallel across said second rectifier for opening, at different times, said second and then said first rectifiers in response to the closing of said second rectifier, said tuned circuit having a definite period, first and second gate means connected to said first and second gate electrodes, respectively, for controllably closing said second and first rectifiers in accordance with a timed sequence, means for initially charging said capacitor to a predetermined voltage, and means for recharging said capacitor at the termination of said period.

6. A variable width pulse generator comprising first and second controlled rectifiers having first and second gate electrodes respectively, said first and second rectifiers being connected serially, in like polarity, with a load across a source of substantially constant electric potential, means including first and second gate means connected to said first and second gate electrodes, respectively, for controllably closing said first and second rectifiers in accordance with a timed sequence, a tuned circuit responsive to the closing of said second rectifier for opening said first and second rectifiers at different times, said tuned circuit comprising a first serial arrangement of an inductor and a capacitor connected electrically in parallel with said second rectifier, and a second serial arrangement of a diode and a first resistance connected electrically in parallel with said first serial arrangement, said diode being poled in a direction opposite to the direction in which said second rectifier is poled, and a third rectifier, said third rectifier having gate, cathode, and anode electrodes, said anode being connected between said source and said load resistance, and said gate and cathode being connected across said first resistance.

7. A variable width pulse generator comprising a first controlled rectifier connected electrically in series with a load across a source of substantially constant electric potential, a second controlled rectifier, said first and second controlled rectifiers having first and second gate electrodes, respectively, means including first and second gate means connected to said first and second gate electrodes, respectively, for closing said first and second rectifiers in accordance with a timed sequence, and a tuned circuit responsive to the closing of said second rectifier for opening said first and second rectifiers, said tuned circuit including a serial arrangement of said second controlled rectifier, shunted by a first diode poled in a direction opposite to that in which said second rectifier is poled, an inductor and a capacitor, and a second diode, said second diode being connected in shunt across said first rectifier and poled in a direction opposite that in which said first rectifier is poled.

8. A variable width pulse generator comprising a first controlled rectifier connected electrically in series with a load across a source of substantially constant electric potential, second and third controlled rectifiers, said first, second and third controlled rectifiers having first, second and third gate electrodes, respectively, means including first and second gate means connected to said first and second gate electrodes, respectively, for closing said rectifiers in accordance with a timed sequence, a branched network connected electrically in parallel with said first controlled rectifier, said branched network comprising a first branch including a serial arrangement of a first resistor and a first diode poled in a direction opposite to that of said first rectifier, a second branch including said second controlled rectifier poled in the same direction as said first controlled rectifier, and a third branch including a serial arrangement of an inductor and a capacitor, a second diode connected between said first and second branches, said second diode being poled in the same direction as said second rectifier, said third controlled rectifier having anode and cathode electrodes, the anode and gate electrodes of said third rectifier being connected across said load resistance, the cathode electrode of said third rectifier being connected between said first resistor and said first diode.

9. A variable width pulse generator in accordance with claim 8 wherein said third branch includes a resistance electrically in parallel with said inductor therein.

10. A variable width pulse generator comprising first and second controlled switches having first and second gate electrodes respectively, said first and second switches being connected in series with a load across a source of substantially constant electric potential, means including first and second gate means connected to said first and second gate electrodes, respectively, for controllably closing said first and second switches in accordance with a timed pulse sequence, and a tuned circuit responsive to the closing of said second switch for controllably opening said first and second switches.

References Cited

UNITED STATES PATENTS 2,916,640 12/1959 Pearson ------------- 328—67

ARTHUR GAUSS, *Primary Examiner.*

B. P. DAVIS, *Assistant Examiner.*